(12) United States Patent
Thubert et al.

(10) Patent No.: US 9,407,392 B2
(45) Date of Patent: Aug. 2, 2016

(54) DYNAMIC BANDWIDTH ALLOCATION IN TDMA COMMUNICATION SYSTEMS

(71) Applicant: Cisco Technology, Inc., San Jose, CA (US)

(72) Inventors: Pascal Thubert, La Colle sur Loup (FR); Jean-Philippe Vasseur, Saint Martin d'Uriage (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 263 days.

(21) Appl. No.: 13/930,463

(22) Filed: Jun. 28, 2013

(65) Prior Publication Data

US 2015/0003468 A1    Jan. 1, 2015

(51) Int. Cl.
*H04L 5/00* (2006.01)
*H04J 3/22* (2006.01)
*H04B 7/26* (2006.01)
*H04W 52/02* (2009.01)

(52) U.S. Cl.
CPC ............... *H04J 3/22* (2013.01); *H04B 7/2643* (2013.01); *H04L 5/0037* (2013.01); *H04W 52/0216* (2013.01); *Y02B 60/50* (2013.01)

(58) Field of Classification Search
CPC .... H04J 3/22; H04L 5/0037; H04W 72/0446; H04W 72/042; H04W 72/0413; H04W 24/08
USPC .................... 370/442, 328, 329, 336
See application file for complete search history.

(56) References Cited

U.S. PATENT DOCUMENTS

| 7,729,328 | B2 | 6/2010 | Thubert et al. | |
| 8,259,635 | B2 | 9/2012 | Thubert et al. | |
| 2002/0044543 | A1* | 4/2002 | Okajima et al. | 370/347 |
| 2005/0076054 | A1 | 4/2005 | Moon et al. | |
| 2006/0056346 | A1* | 3/2006 | Vadgama et al. | 370/329 |
| 2008/0019307 | A1* | 1/2008 | Tenny et al. | 370/329 |
| 2008/0019327 | A1 | 1/2008 | Kwon et al. | |
| 2009/0042586 | A1* | 2/2009 | Bar et al. | 455/458 |

FOREIGN PATENT DOCUMENTS

EP    2519036 A1    10/2012
GB    2295525 A     5/1996

OTHER PUBLICATIONS

International Search Report and Written Opinion in counterpart International Application No. PCT/US2014/040152, mailed Sep. 9, 2014, 12 pages.

* cited by examiner

*Primary Examiner* — Jamal Javaid
(74) *Attorney, Agent, or Firm* — Edell, Shapiro & Finnan, LLC

(57) ABSTRACT

Techniques are presented herein for use in a Time Division Multiple Access (TDMA) communication system in which devices send transmissions to each other in time slots during a time frame. A plurality of time slots is allocated for a first device to send traffic to a second device. The first device includes in a transmission during at least one of the plurality of time slots an indicator configured to indicate whether a next time slot in the plurality of time slots is used for traffic from the first device to the second device. Thus, the actual usage of a next time slot in a sequence of a plurality of time slots may be dynamically determined by the transmitting device so that the receiving device(s) need not be in the idle listening mode for the next time slot, thereby saving power.

23 Claims, 8 Drawing Sheets

DYNAMIC BANDWIDTH ALLOCATION IN TDMA COMMUNICATION SYSTEMS

TECHNICAL FIELD

The present disclosure relates to communication systems, and more particularly to Time Division Multiple Access communication systems.

BACKGROUND

In Time Division Multiple Access (TDMA) communication systems, time slots are used to control use of communication channel resources, e.g., frequency bandwidth. Communication between any two or more devices is allocated to designated time slots, but in so doing, devices need to be powered up sufficiently to receive data during the designated time slots. However, it is possible that a device may have no data to send at any particular time. Thus, if more time slots are allocated, the bandwidth is augmented, but the power consumption of a recipient device is wasted in an idle listening mode anticipating reception of data in designated time slots.

A device may spend more energy in the idle listening mode (ultimately to determine there is no data to be received) than it spends for actual transmission. In other words, in the absence of traffic, battery life is still depleted, and the greater the maximum bandwidth, the faster it depletes battery life in an idle listening mode.

DESCRIPTION OF EXAMPLE EMBODIMENTS

Overview

Techniques are presented herein for use in a Time Division Multiple Access (TDMA) communication system in which devices send transmissions to each other in time slots during a time frame. A plurality of time slots is allocated for a first device to send traffic to a second device. The first device includes in a transmission during at least one of the plurality of time slots an indicator configured to indicate whether a next time slot in the plurality of time slots is used for traffic from the first device to the second device. Thus, the actual usage of a next time slot in a sequence of a plurality of time slots may be dynamically determined by the transmitting device so that the receiving device(s) need not be in the idle listening mode for the next time slot if there is no data to be transmitted in the next time slot, thereby saving power of the receiving device.

Example Embodiments

Presented herein are techniques to dynamically use time slots of communication channel resources in a Time Division Multiple Access (TDMA) communication system. These techniques are applicable to wireless, wired (electrical or optical) communication systems. For example, and not by way of limitation, these techniques are useful in a wireless mesh network, such as a mesh network compliant with the IEEE 802.15.4e Time Synchronized Channel Hopping (TSCH) standard. The IEEE 802.15.4e standard uses TDMA techniques similar to those used in 3G and 4G/Long Term Evolution (LTE) and Digital Enhanced Cordless Telecommunications (DECT) devices. In general, these techniques are applicable to any time-slot based communication system.

Figure 1:
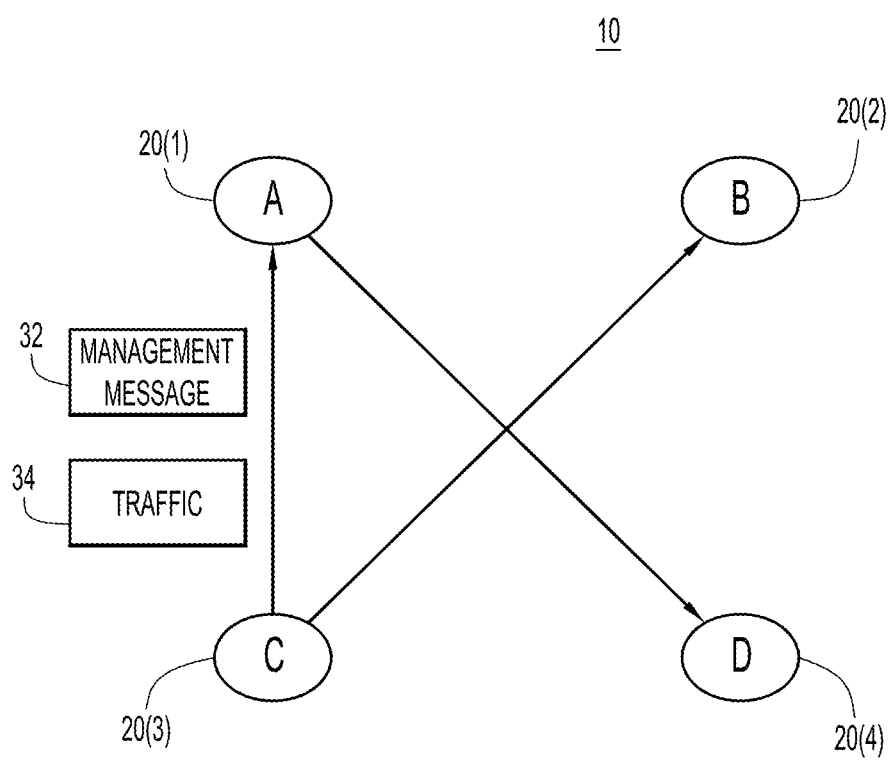
FIG. 1 is a diagram of a communication system in which the dynamic bandwidth techniques presented herein may be used.
Figure 2:
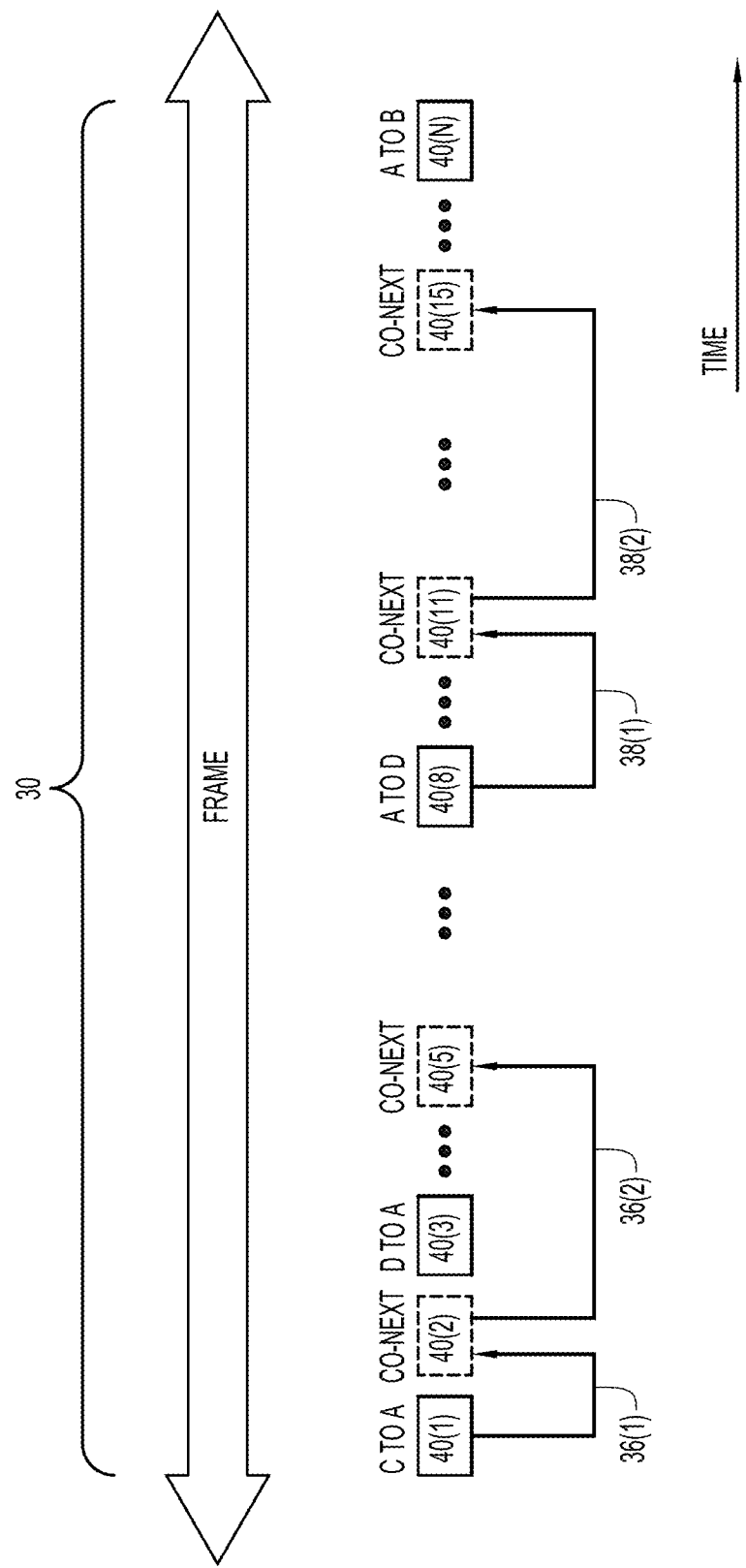
FIG. 2 is diagram generally illustrating the dynamic bandwidth techniques presented herein.

Reference is first made to FIGS. 1 and 2. FIG. 1 shows a communication system 10 that includes, in a simplified example, four communication devices 20(1), 20(2), 20(3) and 20(4), labeled "A", "B", "C" and "D" respectively. The arrows pointing between devices A, B, C and D represent transmissions from one device to another. The devices share a communication channel/media. As shown in FIG. 2, a time frame 30 is divided into a plurality of time slots generally identified by reference numerals 40(1)-40(N). For simplicity, not every consecutive time slot is shown in FIG. 2. In one example, in IEEE 802.15.4e TSCH, one time slot is sized for a maximum data field (typically 128 bytes) and an acknowledgment (ACK) message.

The dynamic bandwidth allocation techniques presented herein involve dynamic time slot usage techniques in which an arbitrary first device has traffic to send to an arbitrary second device (or to multiple devices). Prior to sending traffic, the first device obtains from a central path computation entity or negotiates with its peers (using various media access control techniques outside of the scope of this disclosure) for a set of a plurality of time slots during the frame 30 that it can use when transmitting to the second device. The initial number of time slots can be evaluated based on the size of the network, and the position of this device (node) in the network (e.g. a node close to the root of a mesh network needs more time slots than a leaf node). In a best effort situation, the number of time slots between adjacent devices may be reevaluated over time based on usage. The average usage may be maintained around 10 to 25 percent, allowing for peaks in the 4 to 10 fold range. If the average usage stays consistently outside of that range, additional negotiation may take place to adjust the number of time slots. The resulting set of time slots includes a first or initial time slot and one or more subsequent additional time slots, which may be located in a same or another frame. These "additional time slots" are also referred to herein as "co-next" slots. Moreover, prior to sending the traffic, the first device may notify the second device by a management message that comprises information indicating to the second device the set of a plurality of time slots allocated for the first device to transmit data to the second device. That is, the second device will know which particular time slots to expect data from the first device. FIG. 1 shows the management message at reference numeral 32 transmitted in advance of the traffic represented by reference numeral 34 associated with a transmission from device C to device A.

Even though the set of time slots have been allocated in advance, the first device may not need to use all of these time slots depending on how much data it has queued to send. Therefore, the first device can dynamically control how many time slots it uses for the transmission according to the techniques presented herein. This will allow the second device to avoid any unnecessary receive operations when listening for data from the first device in the time slots that are allocated, but not actually used, by the first device in transmitting to the second device.

For example, as shown in FIG. 2, for a communication session involving transmission of traffic from device C to device A, time slots 40(1), 40(2) and 40(5) are allocated a priori. For a transmission from device A to device D, time slots 40(8), 40(11) and 40(15) are allocated. During the same time frame 30, FIG. 2 also shows that device A sends a transmission to device B during a single allocated time slot 40(N). Other slots may have been allocated for device A to send to device B, but device A only needed a single slot. Similarly, device D transmits to device A during a single time slot 40(3) even though additional time slots were allocated for device D to send to device A.

The arrow 36(1) is meant to represent that the time slot 40(1) of a transmission from device C to device A includes an indicator that indicates the usage of the first co-next time slot 40(2) after the initial time slot 40(1). Similarly, the arrow 36(2) is meant to represent that the first co-next time slot 40(2) includes information indicating that a subsequent (second) co-next time slot 40(5) is used for the transmission. Device A knows, a priori, that slots 40(1), 40(2) and 40(5) have been allocated for use by device C to send a transmission to device A. Consequently, device A will know, when an indicator is set in time slot 40(1) indicating that there is more data to receive in the next time slot, that the next time slot is 40(2). Moreover, device A will know, when an indicator is set in time slot 40(2) indicating that there is more data to receive in the next time slot, that the next time slot is time slot 40(5). Likewise, for a transmission from device D to device A, the initial time slot 40(8) includes information indicating that there is more data to receive in a co-next time slot and device A knows that the co-next time slot occurs at time slot 40(11), as indicated by arrow 38(1). Time slot 40(11) includes information indicating that there is more data to receive, and device A knows that the next co-next time slot occurs at time slot 40(15) as indicated by arrow 38(2), and so on. Thus, a chain of co-next time slots can be dynamically built in this manner from the set of allocated time slots. The length of the chain is variable and is built by the transmitting device (from a set of a priori allocated time slots) as data is queued up for transmission to the receiving device (or multiple receiving devices).

Several mechanisms are possible to exploit the dynamic time slot usage techniques presented herein. In a first example mechanism, a rate is fixed at which a transmitting device is expected to transmit in normal conditions. For example, 1 to 7 co-next slots are available to be allocated for a given assigned time slot for a transmission from a first device to at least one second device. A rate of 1/8 is set when the transmitter is to send only during its assigned or first time slot (with no co-next slots). A rate of 2/8 is set when the transmitter sends on the first and second, or the first and the fourth time slots, for example, where the second and fourth time slots are co-next slots, and so on. The rate may be negotiated in a new Information Element carried in a management frame, e.g., an Extended Beacon (EB) defined for the 802.15.4e media access control (MAC) that would be sent for management (e.g. time synchronization). This first mechanism is useful for relatively a long period of rather constant traffic.

In a second example mechanism that is useful for bursty traffic (e.g., multiple IPv6 over Low power Wireless Personal Area Network (6LoWPAN) fragments of a same Internet Protocol (IP) packet), the sending device indicates that a subsequent time slot will contain more data by setting information indicating that more data is to come. In that case, the destination device will actually wake up on the subsequent time slot, and this will continue as long as the information is set in subsequent allocated time slots. When the indicator is no longer set in a time slot, operation may revert to the first mechanism.

As explained above, a first device having traffic to send to a second device may send, in advance of the traffic, a management message comprising information indicating which time slots during the time frame are allocated for transmissions from the first device to the second device. Moreover, the first device may negotiate a chain of time slots with its peers so as to indicate which co-next time slots for a transmission should always be listened to and which co-next time slots should be listened to depending on information contained in the previous co-next time slot in the chain. For example, in the example of FIG. 2, device C may notify device A in advance that there are 3 time slots allocated, 40(1), 40(2) and 40(5), and that 40(1) and 40(2) are always to be received, while time slot 40(5) is to be received only when time slot 40(2) includes an indicator that indicates there is more data. Thus, the management message comprises information indicating which of the allocated plurality of time slots are always to be received by the second device and which of the plurality of time slots are to be received by the second device depending on the indicator in a previous time slot. The second device needs to "wake-up" to receive data in a co-next slot if there is information in the previous time slot (the initial time slot or a previous co-next slot) indicating that there is more data to be received.

Figure 3:
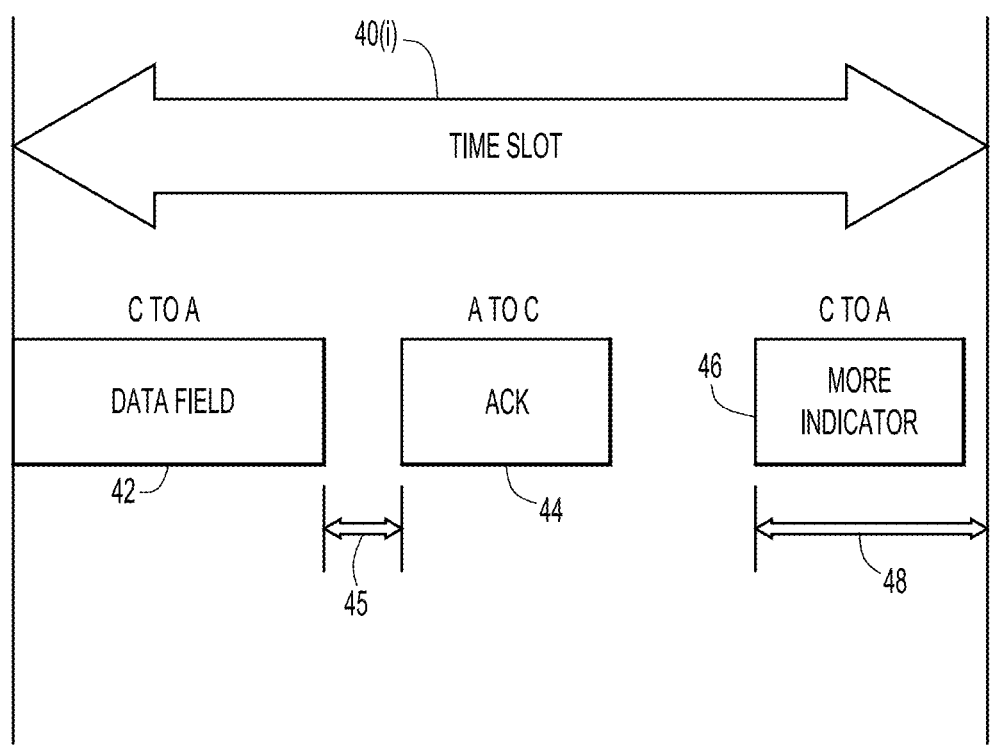
FIG. 3 is a diagram illustrating the format of a time slot and in particular information indicating that there is traffic to receive in a next time slot.

Turning now to FIG. 3, a diagram is shown for an example format of a time slot and the information included in the time slot that indicates whether there is more data to be received in a co-next time slot, that is, whether the co-next time slot is used. At reference numeral 40(i), a time slot is shown. During the slot 40(i), there is a portion allocated for a data field 42 that contains the data transmitted from a sending device to one or more destination/receiving devices. A short time interval after the data field 42 is a time interval 44 allocated for an acknowledgment (ACK) message to be sent from the device(s) that is/are the intended recipient(s) of the data contained in the data field 42. There may be a fixed time interval 45 between the end of the data field 42 and the ACK interval 44. There is a "More" indicator field 46 that begins at a predetermined fixed time interval 48 before the end of the slot 40(i). Since the "More" indicator field 46 is aligned to the end of the time slot, a receiving device knows when to expect the "More" indicator field 46 even if an ACK is not received by the sending device. This is the case even if the data in the data field 42 and/or ACK is/are "lost."

In a simple case, the "More" indicator field 46 is a single bit that, when set (e.g., logic "1"), indicates that there is more data to come and that the destination device should be in the idle receive/listen mode for the data field 42 of the next co-next slot. Conversely, when the bit is not set (e.g., logic "0"), this indicates that there is no more data to come and that the destination device need not be in the idle listen/receive mode for the data field of the next time slot. Thus, in one form, the destination device only wakes up for the data field in a co-next time slot if the "More" indicator field 46 in the previous time slot indicates that it should wake up to receive more data. The destination device may still wake up to examine the "More" indicator field 46 in the next co-next time slot (even if there no data for it in that time slot) to determine if there is data for it in a subsequent co-next slot, which is particularly useful in multi-destination transmissions as described hereinafter. FIG. 3 shows that the indicator of whether there is more data is sent in a field in the time slot after the ACK, and aligned to the end of the time slot, such as 1 ms before the end of the time slot, as opposed to the beginning of the time slot. Using this configuration, it is also possible for the sending device to indicate that a retry of transmitted data will be sent in the next time slot if the ACK was not received from the intended destination device during the current time slot. Said another way, a first device sends data to a second device and determines whether an acknowledgment is received from the second device indicating reception of the transmission during a time slot. If the first device does not receive the acknowledgement from the second device during the time slot, the first device includes the "More" indicator during the time slot, and re-sends during the additional (co-next) time slot the transmission (data) that the second device did not acknowledge.

Figure 4:
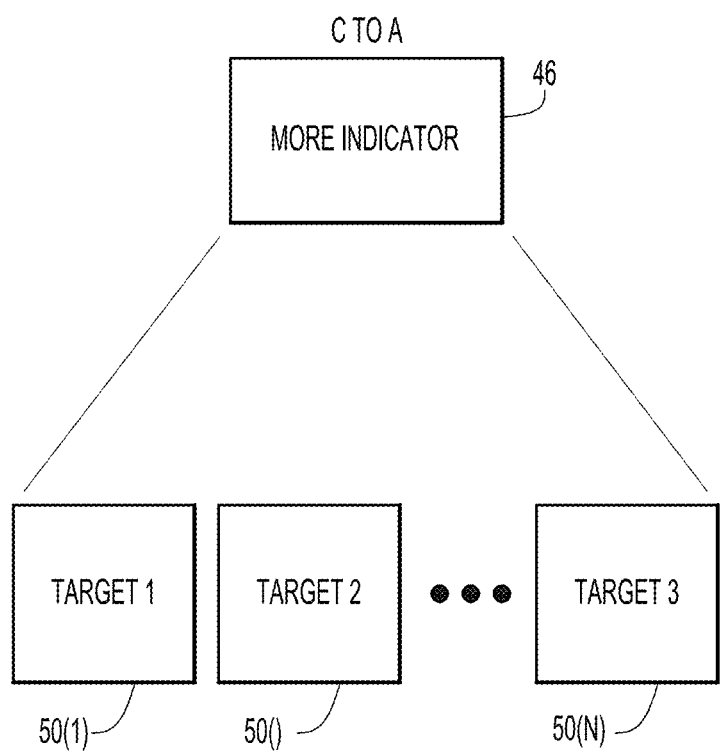
FIG. 4 is a diagram illustrating the format of the information contained in a time slot to indicate that there is traffic in a next time slot for specifically identified destination devices.

Time slots can be used to transmit to multiple destination devices (e.g., "plural listeners"), where one device sends the data and several devices receive that data. Turning to FIG. 4, a diagram is shown for a format of the "More" indicator field 46 configured for multiple destination (target) devices. When configured for multiple destination devices, the "More" indicator field 46 has a plurality of sub-fields 50(1)-50(N), each associated with a corresponding one of the destination devices. If one or more destination devices is/are to receive further data, then the "More" indicator sub-field for each of those one or more destination device(s) is set to indicate that there is more data, whereas the "More" indicator sub-field(s) is not set for the destination device(s) for which there is no more data to be received. In this way, in the case of multiple listeners, the "More" indicator field 46 can indicate which is/are the next target device(s) for a next time slot, and other devices can sleep during the data and ACK fields, and wake up only for the More" indicator field 46 in the next time slot to determine whether a subsequent time slot has data for them. Each of the sub-fields 50(1)-50(N) may comprise a single bit, that when set, indicates that the corresponding destination device is to receive data at the next time slot, and when not set, indicates that the corresponding destination device is not to receive data at the next time slot. For example, sub-field 50(1) is assigned to a first destination device, sub-field 50(2) is assigned to a second destination device, and so on.

Using the "More" indicator field 46 shown in FIG. 4 makes it possible to indicate which of the multiple listeners (destination devices) is to receive data in the next time slot, while the other destination device do not need to listen during the data field 42 and ACK field 44 during the next time slot. The other destination devices wake up 1 ms before end of slot to examine only a portion of the next time slot (e.g., the "More" indicator field 46) that contains target information pertaining to destination devices for a subsequent next time slot to determine whether the subsequent next time slot will be active (contain data) and for which destination devices.

In summary, FIG. 4 shows a configuration in which a time slot is assigned to a first device to send traffic to a group of a plurality of devices. The first device may further include, with the indicator, target information that indicates which one of more of the plurality of devices are intended targets for traffic during the next time slot.

Figure 5:
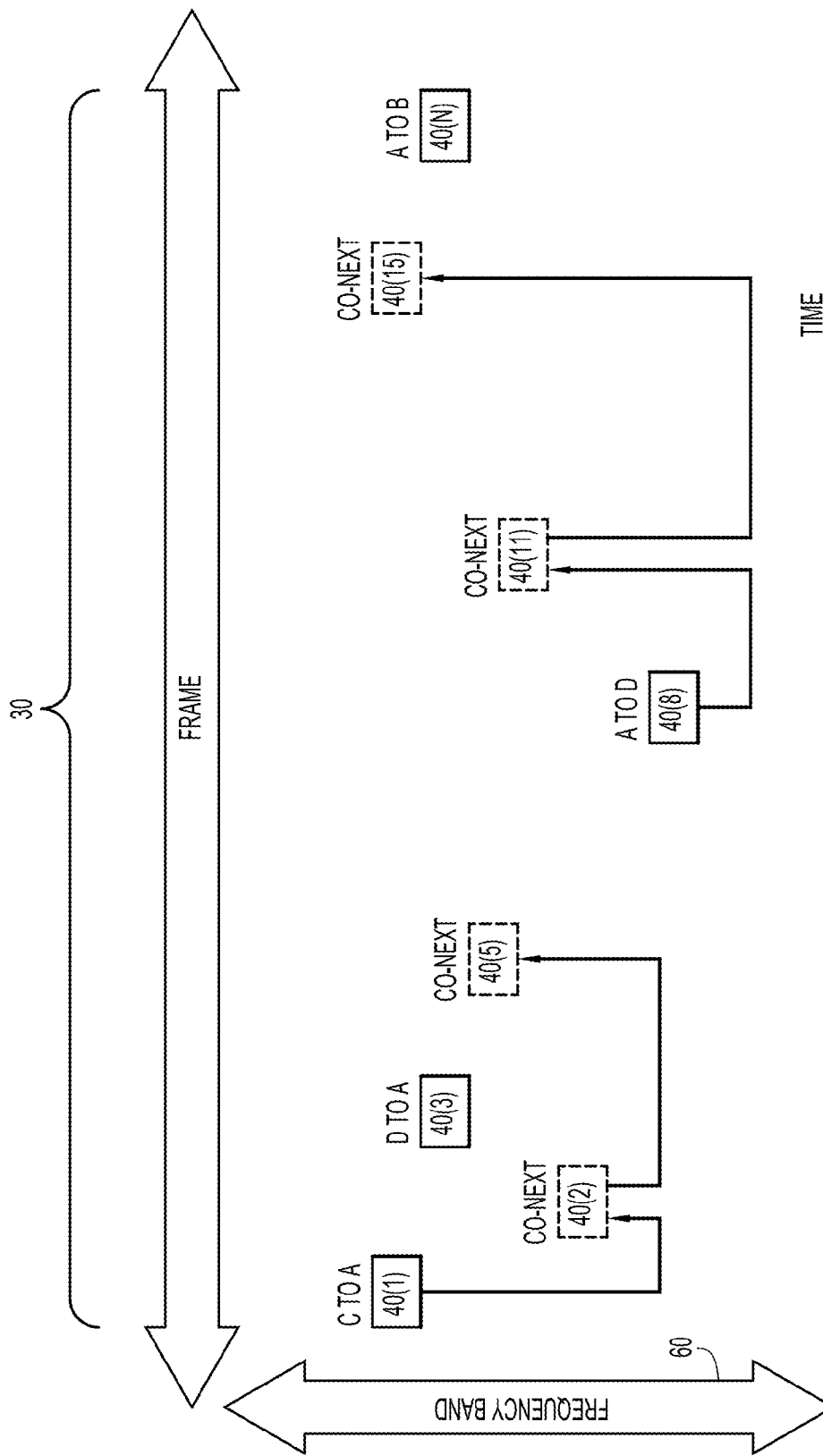
FIG. 5 is a diagram illustrating a variation of the dynamic bandwidth techniques in which frequency hopping is used for each time slot.

Referring now to FIG. 5, a diagram is shown that is similar to FIG. 1, but is generalized for frequency channel hopping systems, and to indicate that co-next slots may occur in relatively widely spaced frequency channels within a frequency band 60. For example, time slot 40(1) is on one frequency channel, co-next time slot 40(2) is on a second frequency channel, and co-next time slot 40(5) is on still another frequency channel. A similar configuration applies for time slots 40(8), 40(11) and 40(15). The configuration shown in FIG. 5 is particularly useful for frequency hopping systems, such as those that operate in accordance with the IEEE 802.15.4e Time Synchronized Channel Hopping (TSCH) standard. Thus, FIG. 5 shows that a different frequency channel in a frequency band may be allocated for each of the time slots.

Figure 6:
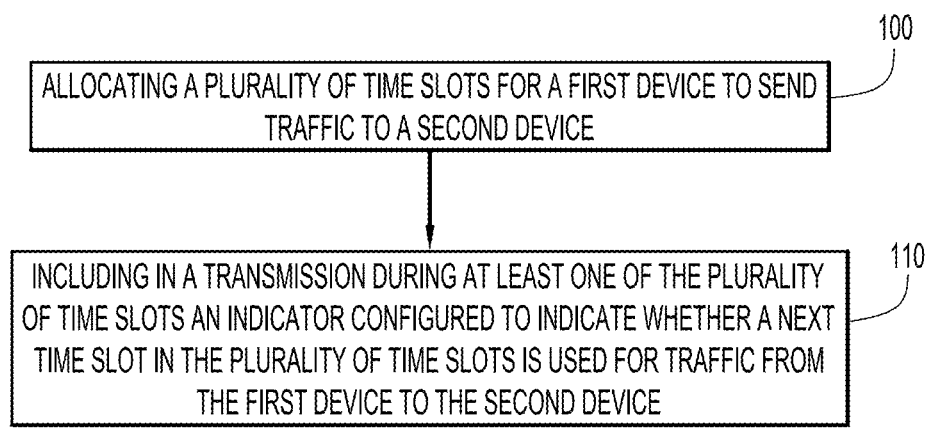
FIG. 6 is a flow chart generally illustrating operations performed in a device for the dynamic bandwidth allocation techniques presented herein.

Turning now to FIG. 6, a high level flow chart is shown depicting operations performed in device that has data to transmit. For simplicity, the source device is referred to as a first device and the destination device is referred to as a second device. These operations are performed in a TDMA system in which devices send transmissions to each other in time slots during a time frame. At 100, a plurality of time slots is allocated for a first device to send traffic to a second device. At 110, the first device includes in a transmission during at least one of the plurality of time slots an indicator configured to indicate whether a next time slot in the plurality of time slots is used for traffic from the first device to the second device. The second device examines the indicator contained in information received during the at least one time slot to determine whether to power up (be in an idle-listen mode) and receive signals from the first device during the next time slot.

If the "More" control is reduced to a single bit, it is possible, as an alternative, to include the "More" bit in an Information Element that is added as a header of the 802.15.4e MAC data frame. In that case, the use of co-next time slots for retries is based on an implicit understanding by both parties that a loss of data of a time slot implies a retry in the co-next time slot. If a data frame is not fully received, then the second device assumes a value of TRUE even if the value of FALSE was received in the frame header. Conversely, if the ACK for a data frame is not received, the first device retries the data frame in the co-next slot, considering that the second device assumed "More" to be TRUE. It could be the case that the initial frame was received and the ACK was lost, and in that case, the second device may not be listening and will not ACK the second copy or further retries on co-next slots, but it does not matter since the frame was effectively transmitted. In other words, the first device automatically retransmits to the second device in the next time slot data that was not acknowledged by the second device in a current time slot, and the second device automatically powers up during the next time slot to receive the data that it did not receive in the current time slot.

As described above in connection with FIGS. 1 and 2, the first device may negotiate with its peers (other devices sharing the frequency band) a set of time slots to use, and may indicate which of the time slots a destination device, e.g., the second device, it should always listen on (power-up its receive in order to receive data) and which time slots in the chain depend on the status of the "More" information field in the previous time slot, and thus the destination device should examine the More" information field in the previous time slot. The first device may include an indicator in each of the plurality of time slots to indicate whether the next time slot of the plurality of time slots is used for traffic from the first device to the second device. As the chain of time slots is transmitted, the second device examines the indicator contained in information received during each of the plurality of time slots to determine whether to power up and receive traffic from the first device during the next time slot in the sequence of the plurality of time slots.

Figure 7:
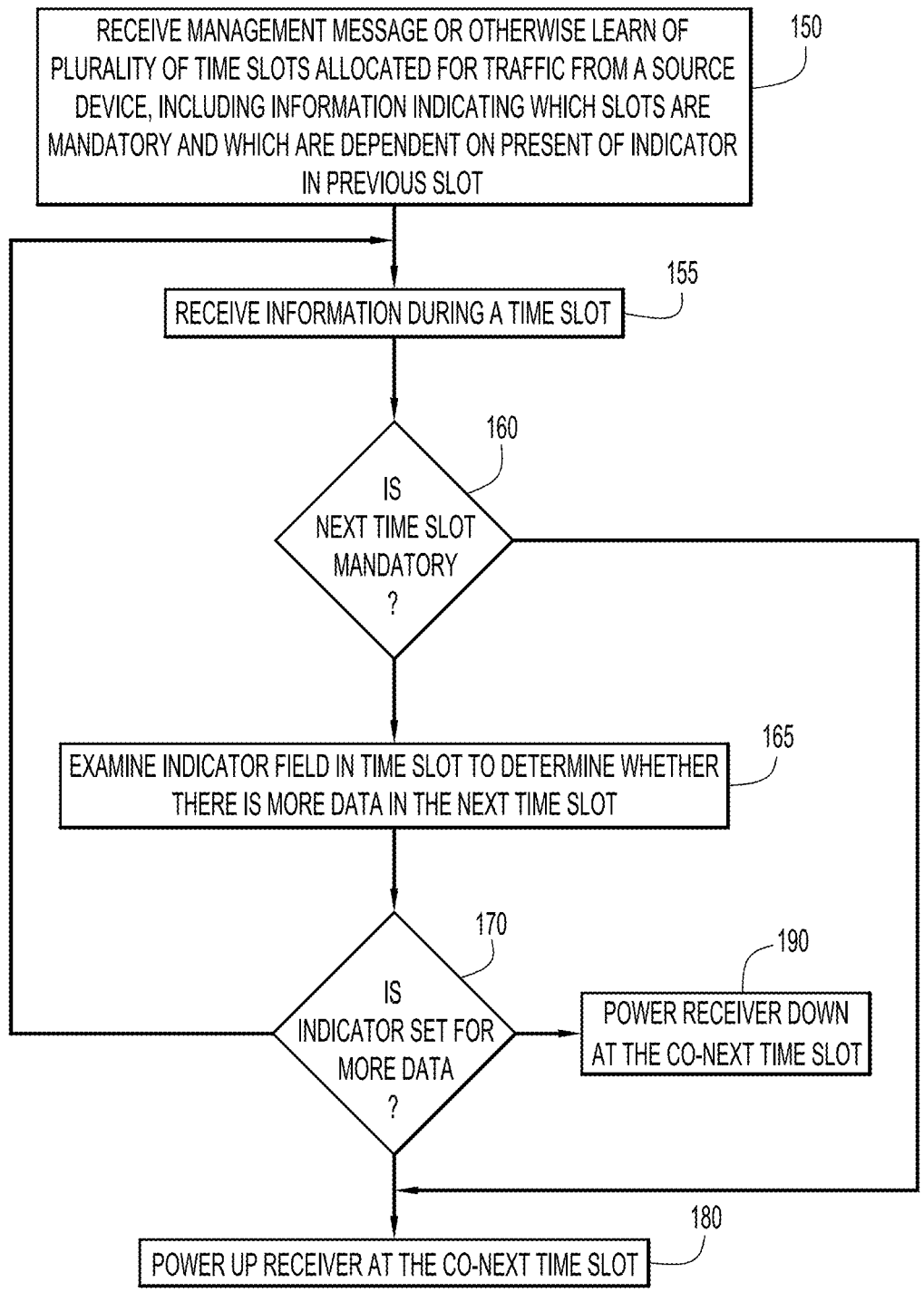
FIG. 7 is a flow chart generally illustrating operations performed in a device that receives transmissions in time slots according to the dynamic bandwidth allocation techniques presented herein.

Turning to FIG. 7, a flow chart is shown depicting operations performed in a device that receives transmissions according to the dynamic bandwidth allocation techniques. At 150, a device receives a management message or otherwise learns of a plurality of time slots allocated for traffic from a source device, including information indicating which slots are mandatory and which are dependent on present of indicator in previous slot. At 155, the device receives information during a time slot. At 160, the device determines, based on the information obtained 150, whether the next time slot is mandatory. If the next time slot is mandatory, then the process goes to operation 180. If the next time slot is not mandatory, then the process goes to operation 165. At 165, the device examines the "More" indicator field during the time slot. At 170, the device determines whether or not the "More" indicator is set to indicate that there is more data to receive in the next time slot. If it the "More" indicator is set, then at 180, the device powers its receiver to receive data at the co-next time slot (and it knows when that time slot will occur from a priori knowledge about all the time slots allocated for a transmission from a source device). The process then repeats from operation 155. If the "More" indicator is not set, then at 190, the device can power the receiver down for the duration of the co-next slots.

When a transmission is directed to a group of devices, the operations performed in each device may be somewhat different in that a given time slot may contain data for some devices and not other devices in the group, but all devices in the group will still power the receive in order to receive the "More" information field that also includes the aforementioned target information which indicates which device(s) are to receive data at the next time slots.

Figure 8:
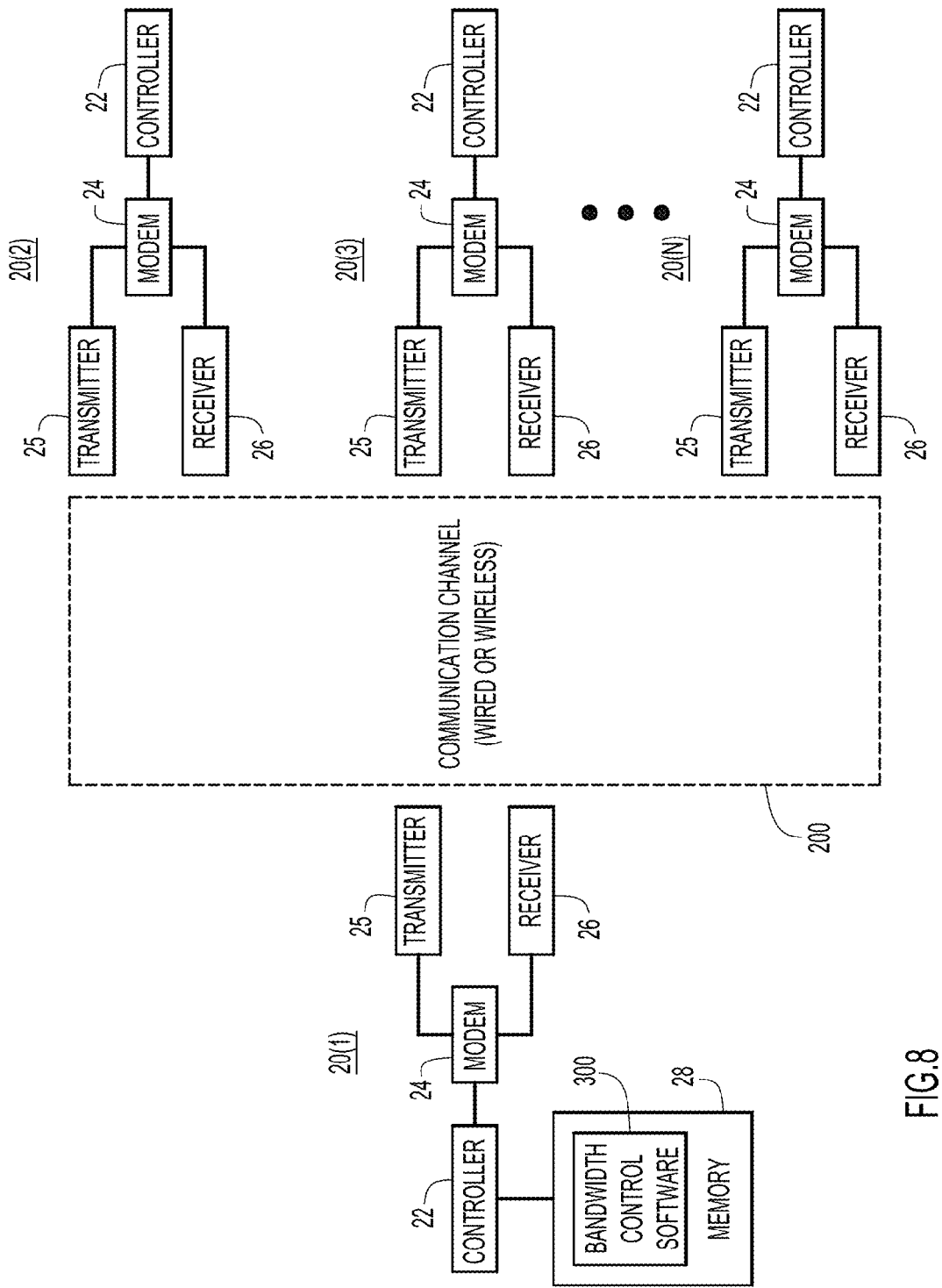
FIG. 8 is a system block diagram illustrating a first device configured to send transmissions to one or more second device using the dynamic bandwidth allocation techniques presented herein.

Reference is now made to FIG. 8, which shows a block diagram of a communication device configured to perform the dynamic bandwidth techniques described above in connection with FIGS. 1-7. In FIG. 8, a block diagram is shown for communication device 20(1) configured to communicate with any one or more of communication devices 20(2)-20(N) across a communication channel 200. Each of the communication devices may be configured in a similar manner, but for simplicity communication device 20(1) is shown in more detail than communication devices 20(2)-20(N). The communication devices each comprise a controller 22, modem 24, transmitter 25, receiver 26 and memory 28. The controller 22 may comprise a microprocessor or microcontroller, or one or more application specific integrated circuits (ASICs). FIG. 8 shows, in detail for communication device 20(1), that the memory 28 stores executable instructions for bandwidth control software or firmware 300 that, when executed by the controller 22, cause the controller 22 to perform operations described above in connection with FIGS. 1-7 (on behalf of a communication device that is transmitting or receiving). Alternatively, the operations described above in connection with FIGS. 1-7 may be performed in hardware (e.g., fixed or programmable digital logic gates) by the controller 22 (if the controller is a hardware device) or by the modem 24, a combination of the controller 22 and modem 24, or a separate control block.

The memory 28 may comprise read only memory (ROM), random access memory (RAM), magnetic disk storage media devices, optical storage media devices, flash memory devices, electrical, optical, or other physical/tangible memory storage devices. In general, the memory 28 may comprise one or more tangible (non-transitory) computer readable storage media (e.g., a memory device) encoded with software comprising computer executable instructions and when the software is executed (by the controller 22) it is operable to perform the operations described herein. The controller 22 is configured to cause the modem to supply data for traffic to be transmitted to either a single device, or a group of a plurality of devices, and when a group transmission is made, to further include target information indicating which one or more of the plurality of devices are intended for traffic during a next time slot.

In summary, techniques are presented herein to dynamically allocate bandwidth based on usage, and controlled by a minimum number bits. In average/typical conditions, the send/receive of data and acknowledgements only occur in a portion of the time slots, and one or more bits in a frame control can be used to indicate if the next slot will be used or not depending on queue states and fragments being generated at the transmitting device. This allows a lower wake-up rate for receiving devices to listen in idle condition, thereby saving battery power.

In method form, a method is provided comprising, in a time division multiple access communication system in which devices send transmissions to each other in time slots during a time frame, allocating a plurality of time slots for a first device to send traffic to a second device; and the first device including in a transmission during at least one of the plurality of time slots an indicator configured to indicate whether a next time slot in the plurality of time slots is used for traffic from the first device to the second device.

Similarly, an apparatus is provided, comprising: a transmitter configured to transmit signals in a communication channel; a modem configured to modulate signals for transmission by the transmitter; and a controller coupled to the modem, wherein the controller is configured to include in a transmission during at least one of a plurality of time slots allocated to transmit traffic from a first device to a second device, an indicator configured to indicate if a next time slot in the plurality of time slots is used for traffic from the first device to the second device.

Furthermore, one or more computer readable storage media are provided encoded with instructions that, when executed by a processor, cause the processor to: allocate a plurality of time slots for a first device to send traffic to a second device in a time division multiple access communication system; and include in a transmission during at least one of the plurality of time slots an indicator configured to indicate whether a next time slot in the plurality of time slots is used for traffic from the first device to the second device.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   in a time division multiple access communication system in which devices send transmissions to each other in time slots during a time frame, allocating a plurality of time slots for a first device to send traffic to a second device; and
   the first device including in a transmission during at least one of the plurality of time slots a data field for traffic intended for the second device followed by an indicator field aligned to an end of the time slot and the indicator field containing an indicator to indicate whether a next time slot in the plurality of time slots is used for a continuation of the traffic from the first device to the second device, wherein the first device sends traffic to a group of a plurality of devices that includes the second device, and wherein the including comprises including in the transmission during at least one of the plurality of time slots a plurality of indicators each to indicate whether a corresponding one of the plurality of devices is intended for traffic during the next time slot.

2. The method of claim 1, further comprising the second device examining the indicator contained in a transmission received during the at least one time slot to determine whether to receive traffic from the first device during the next time slot.

3. The method of claim 1, further comprising the first device retransmitting to the second device in the next time slot data that was not acknowledged by the second device in a current time slot, and the second device automatically powering up during the next time slot to receive the data that it did not receive in the current time slot.

4. The method of claim 1, further comprising the first device including an indicator in each of the plurality of time slots to indicate whether the next time slot of the plurality of time slots is used for traffic from the first device to the second device.

5. The method of claim 4, further comprising the second device examining the indicator contained in information received during each of the time slots to determine whether to receive traffic from the first device during the next time slot.

6. The method of claim 1, wherein the indicator field begins a predetermined period of time before an end of the time slot.

7. The method of claim 6, wherein the indicator is a single bit.

8. The method of claim 1, further comprising a destination device examining the target information in a time slot to determine whether to receive traffic in the next time slot, and when it is determined the destination device does not receive traffic in the next time slot, further comprising receiving only a portion of the next time slot that contains target information pertaining to destination devices for a subsequent next time slot.

9. The method of claim 1, further comprising allocating different frequency channels in a frequency band for respective ones of the plurality of time slots.

10. The method of claim 1, further comprising the first device sending to the second device, in advance of the traffic, a management message comprising information indicating which of the plurality of time slots are always to be received by the second device and which of the plurality of time slots are to be received depending on an indicator in a previous time slot.

11. The method of claim 1, further comprising:
the first device determining whether an acknowledgment is received from the second device indicating reception of the transmission during a time slot;
if the first device does not receive the acknowledgement from the second device during the time slot, the first device including the indicator during the time slot to indicate that the second device is to receive traffic during the next time slot in the plurality of time slots; and
re-sending the transmission during the next time slot.

12. The method of claim 1, wherein the at least one of the plurality of time slots includes an acknowledgement (ACK) field between an end of the data field and a start of the indicator field, the acknowledgment field for receipt of an acknowledgement from the second device that acknowledges traffic in the data field.

13. The method of claim 12, wherein the at least one of the plurality of time slots further includes a fixed time interval between the end of the data field and a start of the ACK field.

14. The method of claim 12, wherein the start of the indicator field is a fixed time interval from the end of the time slot.

15. The method of claim 12, further comprising:
the first device determining whether an acknowledgment is received from the second device in the ACK field indicating reception of the traffic;
if the first device does not receive the acknowledgement from the second device during the ACK field, the first device including the indicator during the indicator field to indicate that the second device is to receive traffic during the next time slot in the plurality of time slots; and
re-sending the traffic during the next time slot.

16. An apparatus comprising:
a transmitter configured to transmit signals in a communication channel;
a modem configured to modulate signals for transmission by the transmitter; and
a controller coupled to the modem, wherein the controller is configured to:
include in a transmission during at least one of a plurality of time slots allocated to transmit traffic from a first device to a second device, a data field for traffic intended for the second device followed by an indicator field aligned to an end of the time slot and containing an indicator to indicate if a next time slot in the plurality of time slots is used for a continuation of the traffic from the first device to the second device;
cause the modem to supply data for traffic to be transmitted to a group of a plurality of devices that includes the second device; and
further include in the transmission during the at least one of the plurality of time slots a plurality of indicators each to indicate whether a corresponding one of the plurality of devices is intended for traffic during the next time slot.

17. The apparatus of claim 16, wherein the controller is configured to include an indicator in each of the plurality of time slots to indicate whether the next time slot of the plurality of time slots is used for traffic from the first device to the second device.

18. The apparatus of claim 16, wherein the controller is configured to cause the transmitter to transmit on different frequency channels for respective ones of the plurality of time slots.

19. The apparatus of claim 16, wherein the controller is configured to generate, for transmission to the second device in advance of the traffic, a management message comprising information indicating which of the plurality of time slots are always to be received by the second device and which of the plurality of time slots are to be received depending on an indicator in a previous time slot.

20. One or more computer readable storage media encoded with instructions that, when executed by a processor, cause the processor to:
allocate a plurality of time slots for a first device to send traffic to a second device in a time division multiple access communication system;
include in a transmission during at least one of the plurality of time slots a data field for traffic intended for the second device followed by an indicator field aligned to an end of the time slot, the indicator field containing an indicator to indicate whether a next time slot in the plurality of time slots is used for a continuation of the traffic from the first device to the second device;

cause data for traffic to be to be transmitted to a group of a plurality of devices that includes the second device; and further include in the transmission during the at least one of the plurality of time slots a plurality of indicators each to indicate whether a corresponding one of the plurality of devices is intended for traffic during the next time slot.

21. The computer readable storage media of claim 20, wherein the instructions operable to include comprise instructions operable to include an indicator in each of the plurality of time slots to indicate whether the next time slot of the plurality of time slots is used for traffic from the first device to the second device.

22. The computer readable storage media of claim 20, wherein the indicator field begins a predetermined period of time before an end of the time slot.

23. The computer readable storage media of claim 20, further comprising instructions operable to generate for transmission to the second device in advance of the traffic a management message comprising information indicating which of the plurality of time slots are always to be received by the second device and which of the plurality of time slots are to be received depending on an indicator in a previous time slot.

* * * * *